Oct. 26, 1954     B. F. SPENCER     2,692,947
LOCATOR OF INFLECTION POINTS OF A RESPONSE CURVE
Filed May 11, 1951     2 Sheets-Sheet 1

INVENTOR
BENJAMIN F. SPENCER
BY
Paul B. Hunter
ATTORNEY

INVENTOR
BENJAMIN F. SPENCER
BY
Paul B. Hunter
ATTORNEY

Patented Oct. 26, 1954

2,692,947

UNITED STATES PATENT OFFICE 2,692,947

LOCATOR OF INFLECTION POINTS OF A RESPONSE CURVE

Benjamin F. Spencer, East Meadow, N. Y., assignor to The Sperry Corporation, a corporation of Delaware Application May 11, 1951, Serial No. 225,876

16 Claims. (Cl. 250—36)

This invention relates to methods and apparatus for determining the frequencies at which the response of a translating device is substantially linear, and particularly to methods and apparatus for determining the frequencies at which inflection points are located along the response curve of a translating device.

Copending application S. N. 220,573 filed on April 12, 1951, by Nelson E. Beverly discloses certain methods and apparatus for determining the frequencies at which the response of a translating device is substantially linear. In accordance with the invention disclosed in the Beverly application, the response of a translating device is determined by energizing the translating device with a frequency-modulated radio frequency signal and deriving a signal by means of the translating action of the translating device which has distortion components which vary in magnitude in accordance with the second derivative of the response curve of the translating device. The amplitude of the distortion components of the derived signal are a minimum at the radio frequencies at which the response of the translating device is substantially linear.

In accordance with the present invention, the frequencies at which the response of a translating device is substantially linear are determined by energizing the translating device with a frequency-modulated radio frequency signal and thereby inducing an amplitude-modulated signal in the translating device as a result of the translating action of the translating device. The signal which is induced in the translating device has distortion components which have a phase relationship with respect to the modulation of the radio frequency signal which is determined by the curvature of the response curve of the translating device. Thus, if there is an inflection point along the response curve of the translating device, the aforesaid phase relationship changes abruptly when the frequency of the radio frequency signal is changed from a frequency which is slightly less than the frequency at which the inflection point of the response curve of the translating device is located to a frequency which is slightly greater than the frequency at which the inflection point is located. The response of the translating device is substantially linear at the frequency at which such an inflection point is located.

By providing a signal which varies in accordance with the aforesaid phase relationship, the frequency at which the inflection point occurs may be determined accurately by manually operated apparatus. Also, apparatus may be provided for automatically causing the fundamental frequency of the radio frequency signal to be maintained at the frequency at which the inflection point of the response curve of the translating device is located.

One application of the present invention is in the measurement of the Q of a resonant circuit. The resonance curve of a resonant circuit has two inflection points at the two frequencies at which the response of the resonant circuit is substantially linear. By determining the frequencies at which the two inflection points of the resonance curve occur, it is possible to calculate the Q of the circuit.

Another application of the invention is an arrangement for causing the fundamental frequency of a frequency-modulated signal to be maintained automatically at the frequency at which an inflection point of the response curve of a translating device, such as a filter, is located.

Accordingly, it is an object of the present invention to provide improved methods and apparatus for determining the frequencies at which inflection points are located along the response curve of a translating device.

Another object of the invention is to provide improved methods and apparatus for measuring the Q of a resonant circuit.

A further object of the invention is to provide apparatus for automatically maintaining the frequency of a radio frequency oscillator at the frequency at which an inflection point of the response curve of a translating device is located.

Other objects and advantages of the invention will appear from the following description, the appended claims, and the drawings, wherein:

Figure 1:
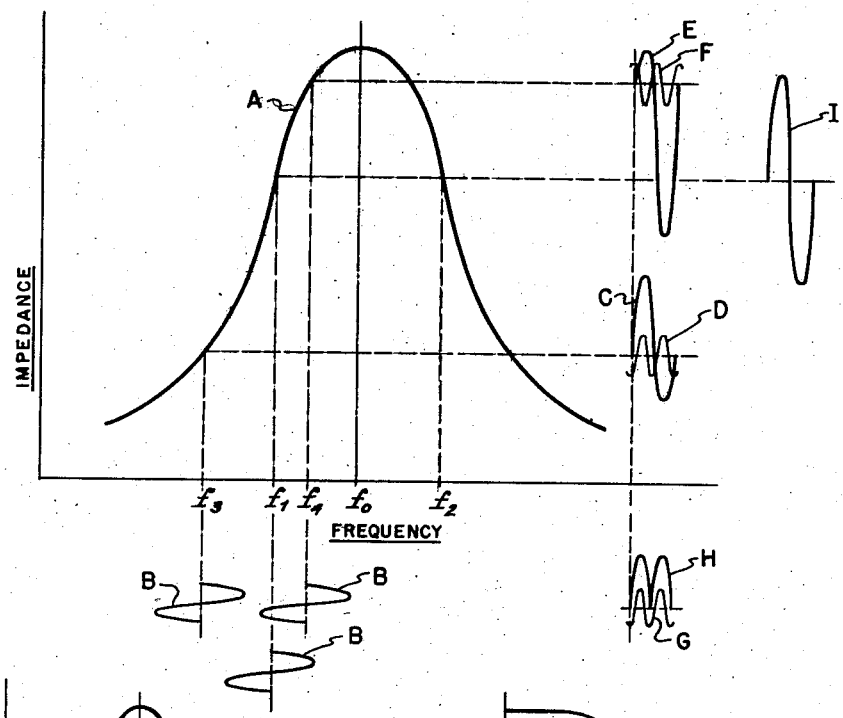
Fig. 1 shows a resonance curve of a resonant circuit and various wave forms which illustrate the operation of the invention.

Referring now to Fig. 1, the curve A is the resonance curve of a parallel resonant circuit. The frequency $f_0$ is the resonant frequency, and the two inflection points of the resonance curve are located at the frequencies $f_1$ and $f_2$.

If a radio frequency signal having a frequency $f_3$ which is less than the frequency $f_1$ is frequency-modulated by a signal B, the frequency-modulated signal is converted by the translating action of the resonant circuit to a hybrid signal which includes an amplitude-modulated radio frequency signal whose modulation is represented by curve C. Due to the non-linear impedance of the resonant circuit with respect to frequency, the amplitude modulation C of the amplitude-modulated radio frequency signal which is induced in the resonant circuit contains distortion components, and the second harmonic component D is large.

If the frequency-modulated radio frequency signal has a frequency $f_4$ which is more than the frequency $f_1$ but less than the frequency $f_0$, the frequency-modulated signal is converted by the translating action of the resonant circuit to a hybrid signal which includes an amplitude-modulated radio frequency signal whose modulation is represented by curve E. Due to the non-linear impedance of the resonant circuit, the amplitude modulation E contains a large second harmonic distortion component F.

If the frequency-modulated radio frequency signal has a frequency $f_1$ at which one of the inflection points is located, the frequency-modulated signal is converted by the translating action of the resonant circuit to a hybrid signal which includes an amplitude-modulated signal whose modulation is represented by the curve I. Since the impedance of the resonant circuit is substantially linear at the frequency $f_1$, the amplitude modulation I is substantially undistorted and there is substantially no second harmonic component. Likewise, the amplitude-modulated signal which is produced at the frequency $f_2$ is substantially undistorted and there is substantially no second harmonic component.

If the phase of the second harmonic distortion components D and F are compared with a reference signal G having the same frequency as the components D and F, it will be found that there is a 180° reversal in the phase relationship between the second harmonic distortion components and the reference signal as the fundamental frequency of the frequency-modulated radio frequency signal is changed from a frequency less than $f_1$ to a frequency intermediate the frequencies $f_1$ and $f_2$.

It will be apparent that there is also a 180° reversal in the phase relationship between the second harmonic distortion components and the reference signal as the fundamental frequency of the frequency-modulated radio frequency signal is changed from a frequency intermediate the frequencies $f_1$ and $f_2$ to a frequency greater than the frequency $f_2$.

A suitable reference signal G may be provided by means of a signal H produced by a full-wave rectifier type frequency-doubler in response to the modulating signal B.

Thus, if a radio frequency signal which is frequency-modulated at a predetermined frequency is applied to a translating device at frequencies at which the translating device has a non-linear frequency response, the frequency-modulated radio frequency signal is converted by the translating device to a hybrid signal containing a frequency-modulated radio frequency signal and an amplitude-modulated radio frequency signal whose modulation envelope includes harmonic distortion of the modulating signal. The phase relationship between the harmonic distortion components and the second harmonic of the modulating frequency is determined by the curvature of the response curve of the translating device, and there is an abrupt change in this phase relationship at the frequency at which an inflection point of the response curve of the translating device is located.

Also, if a radio frequency signal which is frequency-modulated by two or more frequencies is applied to a translating device at frequencies at which the translating device has a non-linear radio frequency response, the frequency-modulated signal is converted by the translating device to hybrid signal containing an amplitude-modulated radio frequency signal whose modulation envelope includes heterodyne or intermodulation distortion of the modulating signals as well as harmonic distortion thereof. In this case, the phase relationship between the heterodyne distortion components and one of the first order heterodyne components produced by the two modulating frequencies is also governed by the curvature of the response curve of the translating device, and there is an abrupt change in this phase relationship at the frequency at which an inflection point of the response curve of the translating device is located.

The amplitude-modulated signal which is induced in the translating device may be detected in a conventional manner so as to provide a demodulated signal, and the phase relationship between a harmonic distortion component of the demodulated signal and a reference signal derived from the modulating signal may be compared to provide an indication of the abrupt phase changes.

If the translating device is a resonant circuit and a linear detector is employed to demodulate the amplitude-modulated signal, the Q of the resonant circuit is related to the frequencies at which the inflection points of the resonant curve are located in accordance with the following expression:

$$Q=\frac{f_0}{\sqrt{2}(f_2-f_1)}$$

where $f_0$ is the resonant frequency of the resonant circuit, and $f_1$ and $f_2$ are the frequencies at which the inflection points of the resonance curve of the resonant circuit are located.

Figure 2:
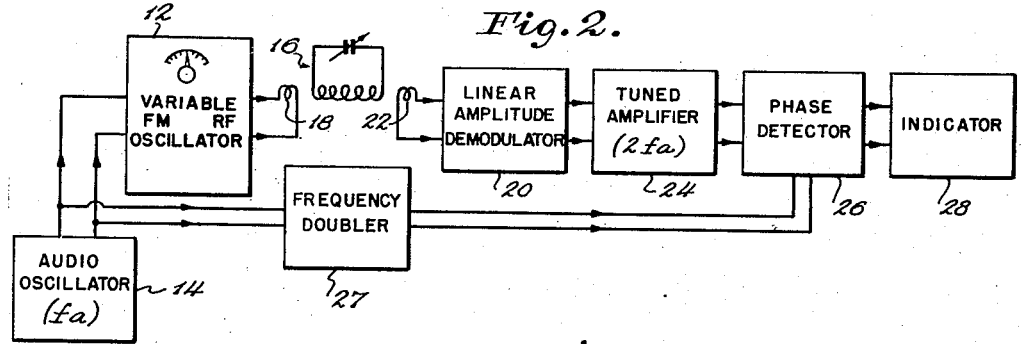
Fig. 2 shows an embodiment of the invention for measuring the Q of a resonant circuit.

Fig. 2 shows apparatus which may be employed to measure the frequencies $f_0$, $f_1$ and $f_2$ in order to determine the Q of the resonant circuit by means of the harmonic distortion components of a signal which is induced in the resonant circuit.

A variable radio frequency oscillator 12 is frequency modulated by means of an audio signal having a frequency $f_a$ which is produced by an audio oscillator 14. The output of the frequency-modulated oscillator 12 is loosely coupled to a resonant circuit 16 in a conventional manner, such as by means of a coupling loop 18, so as to apply a constant input signal to the resonant circuit 16.

A linear detector or amplitude demoduator 20, which is loosely coupled to the resonant circuit 16 in a conventional manner such as by means of a coupling loop 22, serves to detect the amplitude-modulated signal which is produced by the translating action of the resonant circuit 16.

It will be apparent that other types of coupling arrangements, such as resistance or capacitance coupling, may be employed.

The linear amplitude demodulator 20 serves to detect the hybrid wave which is induced in the resonant circuit 16, and the output of the amplitude demodulator 20 is applied to an amplifier 24 which is tuned to the second harmonic ($2f_a$) of the modulating signal produced by the audio oscillator 14. Thus, the signal produced at the output of the tuned amplifier 24 is a demodulated and amplified version of the second harmonic distortion component of the amplitude-modulated signal which is induced in the resonant circuit 16. The output of the tuned amplifier 24 is connected to one of the input circuits of a phase detector 26.

The output of the audio oscillator 14 is also connected to a frequency doubler 27 so as to provide a reference signal which has the same frequency $2f_a$ as the signal representing the second harmonic distortion component which is produced at the output of the tuned amplifier 24.

The output of the frequency doubler 27 is connected to the other input circuit of the phase detector 26. Thus, the phase detector 26 serves to produce an output signal which varies in accordance with the phase relationship between the signals produced at the outputs of the tuned amplifier 24 and the frequency doubler 27.

The output of the phase detector 26 is applied to an indicator 28 which serves to provide an indication of the aforesaid phase relationship.

Figure 3A:
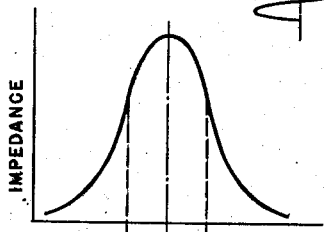
Figs. 3A, 3B and 3C show various curves which illustrate the operation of the apparatus shown in Fig. 2.

Fig. 3A shows the resonance curve of the resonant circuit 16. Due to the non-linear impedance function of the resonant circuit with respect to frequency, the frequency-modulated signal which is applied to the resonant circuit 16 is converted to a hybrid signal which includes a radio frequency signal which is amplitude modulated at the frequency $f_a$ and at harmonics of the frequency $f_a$.

Figure 3B:
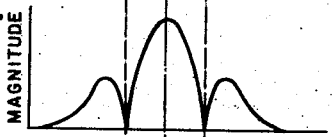

Fig. 3B shows how the magnitude of the harmonic distortion varies as the frequency of the frequency-modulated oscillator 12 is varied with respect to the resonant frequency $f_o$ of the resonant circuit.

Figure 3C:
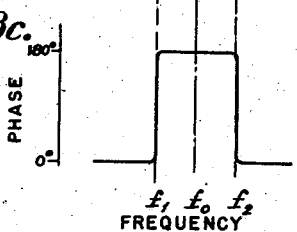

Fig. 3C shows the phase relationship between the second harmonic distortion component of the signal induced in the resonant circuit 16 and the reference signal produced by the frequency doubler 27. Throughout the portions of the resonance curve which are concave upward, the second harmonic distortion component is in phase coincidence with the reference signal produced by the frequency doubler 27, and throughout the portion of the resonance curve which is concave downward there is a 180° difference in phase between the second harmonic distortion component and the reference signal produced by the frequency doubler 27. Thus at each of the frequencies $f_1$ and $f_2$ at which the inflection points of the resonance curve are located, there is an abrupt change in the phase relationship between the second harmonic distortion component of the signal induced in the resonant circuit 16 and the reference signal produced by the frequency doubler 27.

If desired, the frequency doubler 27 may be omitted and the output of the audio oscillator 14 is then connected directly to the input circuit of the phase detector 26. In this case, the phase detector 26 and the indicator 27 must be a type which is suitable for detecting phase changes between harmonically related signals.

A phase angle indicator of the type shown in Patent No. 2,370,692 granted to J. E. Shepherd on March 6, 1945, is satisfactory for use in the apparatus shown in Fig. 2 or for use in the apparatus shown in Fig. 2 modified by the omission of the frequency doubler 27, as discussed above.

If the frequency doubler 27 is omitted and the phase detector 26 and the indicator 28 are the type shown in the aforesaid Patent No. 2,370,692, the indicator 28 will provide an indication which is one-half of the actual phase relationship between the two signals which are applied to the input circuits of the phase detector 26.

In operation, the fundamental frequency of the frequency-modulated oscillator 12 is adjusted to find the two frequencies at which the indicator 28 shows abrupt phase changes. Thus, the frequencies $f_1$ and $f_2$ at which the inflection points of the resonance curve of the resonant circuit 16 occur are the frequencies to which the radio frequency oscillator 12 is adjusted in order to cause the indicator 28 to show abrupt phase changes, and $f_o$ is equal to the sum $f_1$ and $f_2$ divided by 2.

The frequencies $f_1$ and $f_2$ to which the radio frequency oscillator 12 is adjusted may be measured by means of a calibrated dial which is employed in conjunction with the apparatus which serves to adjust the frequency of the oscillator 12, or it may be measured by means of a frequency meter or a frequency standard coupled to the output of the oscillator 12.

It will be apparent that the same results can be obtained if the resonant frequency of the resonant circuit is varied while the fundamental frequency of the frequency-modulated signal produced by the oscillator 12 is maintained constant. In this case, the tuning element of the resonant circuit must be calibrated so that the frequencies at which the abrupt frequency changes occur can be determined from the setting of the tuning element.

Figure 4:
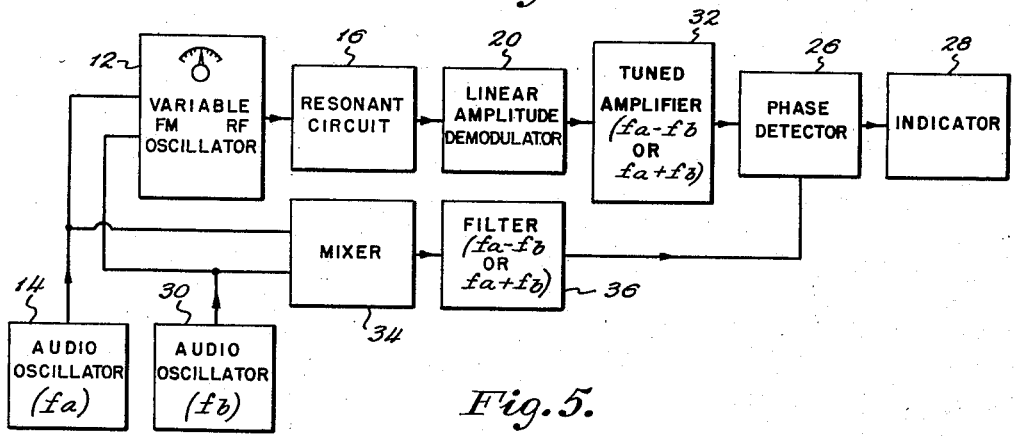
Fig. 4 shows an alternative embodiment of the invention shown in Fig. 2.

Fig. 4 shows apparatus which may be employed to measure the frequencies $f_o$, $f_1$ and $f_2$ in order to determine the Q of a resonant circuit by means of the heterodyne distortion components of the modulating signals which are induced in the resonant circuit.

A variable radio frequency oscillator 12 is frequency-modulated by means of the audio signals having frequencies $f_a$ and $f_b$ which are produced by the audio oscillators 14 and 30. The output of the radio frequency oscillator 12 is loosely coupled to the resonant circuit 16, and the amplitude demodulator 20 is loosely coupled to the resonant circuit 16 as before.

The output of the amplitude demodulator 20 is applied to an amplifier 32 which is tuned to the frequency of one of the first order heterodyne components produced by the modulating signals, i. e., to the frequency $f_a+f_b$ or $f_a-f_b$.

The output of the tuned amplifier 32 is applied to one of the input circuits of the phase detector 26, and the reference signal which is applied to the other input circuit of the phase detector 26 is provided by a mixer 34, which serves to provide heterodyne signals in response to the modulating signals which are provided by the audio oscillators 14 and 30, and by a filter 36 which serves to pass the same first order heterodyne component of the modulating signals as is passed by the tuned amplifier 32.

In this embodiment of the invention, the indicator 28 serves to provide an indication of the phase relationship between one of the first order heterodyne components of the hybrid signal which is induced in the resonant circuit 16 and the same first order heterodyne component of the modulating signals which is produced by mixing the modulating signals $f_a$ and $f_b$ in the mixer 34.

Thus, as the frequency of the radio frequency oscillator 12 is varied with respect to the resonant frequency of the resonant circuit 16, abrupt phase changes are indicated by the indicator 28 at the frequencies $f_1$ and $f_2$, as discussed above with reference to Fig. 1. Since the signals which are applied to the two input circuits of the phase detector 26 have the same frequency, the indicator 28 serves to indicate the phase relationship between two signals directly.

Figure 5:
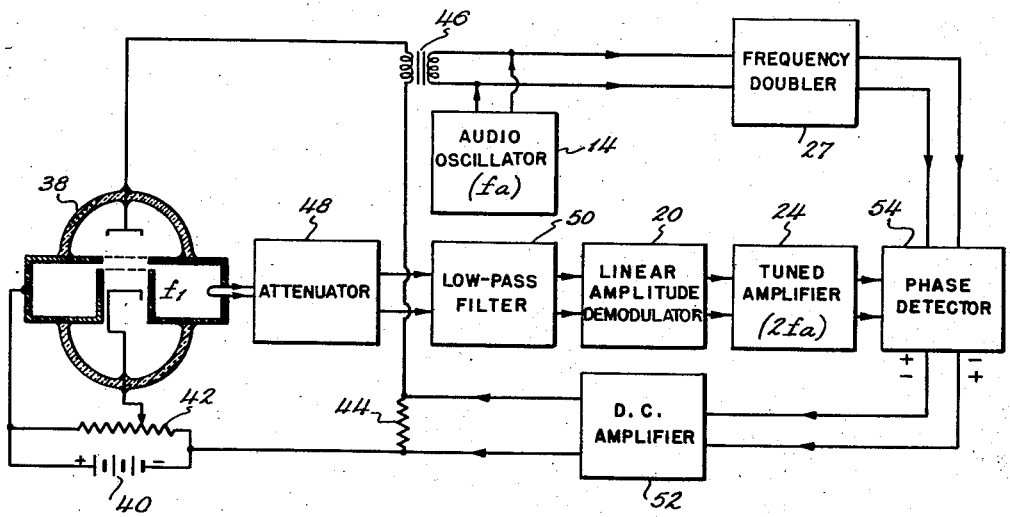
Fig. 5 shows automatic apparatus for maintaining the frequency of a radio frequency oscillator at the frequency at which the inflection point of a translating device is located.

Fig. 5 shows how the invention may be employed in an automatic control arrangement to maintain the frequency of a radio frequency oscillator at the frequency $f_1$ at which the inflection point of the response curve of a translating device, such as a low-pass filter, is located.

A reflex klystron tube 38 serves as the radio frequency oscillator. The voltages which are applied to the various electrodes of the tube 38 are provided by means of a battery 40 and a potentiometer 42. A resistor 44 is provided in the circuit which interconnects the battery 40 and the repeller electrode of the tube 38, so that the fundamental frequency of the oscillations produced by the tube 38 may be controlled by applying suitable potentials across the resistor 44.

The output of the audio oscillator 14 serves to produce a modulating signal having a frequency $f_a$ which is applied through a transformer 46 in series with the lead which provides the voltage for the repeller electrode of the tube 38, so as to frequency-modulate the signal produced by the tube 38 at the frequency $f_a$.

The output of the audio oscillator 14 is also connected to a frequency doubler 27 which serves to provide a reference signal having a frequency $2f_a$.

Figure 6A:
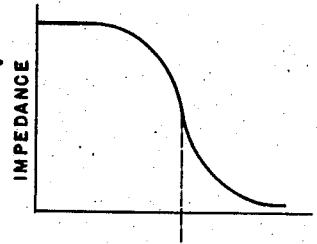
Figs. 6A, 6B and 6C show various curves which illustrate the operation of the apparatus shown in Fig. 5.
Figure 6B:
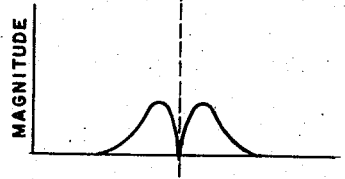
Figure 6C:
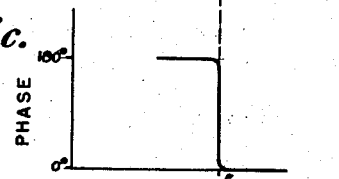

The radio frequency signal produced at the output of the tube 38 is applied through an attenuator 48 to a low-pass filter 50. The response curve of the filter 50 is shown in Fig. 6A. The frequency $f_1$ at which the inflection point of the response curve of the filter 50 is located is the frequency at which it is desired to maintain the radio frequency signal produced by the tube 38. The curve shown in Fig. 6B shows how the magnitude of the harmonic distortion components of the signal which is induced in the filter 50 varies as a function of frequency. The curve shown in Fig. 6C shows how the phase relationship between the harmonic distortion components of the signal induced in the filter 50 and the reference signal produced by the frequency doubler 27 varies as a function of frequency.

The output of the low-pass filter 50 is applied to an amplitude demodulator 20, and the output of the amplitude demodulator 20 is applied to a tuned amplifier 24 which is tuned to the second harmonic of the signal which is produced by the audio oscillator 14.

The output of the tuned amplifier 24 is applied to one of the input circuits of a phase detector 54, and the reference signal which is provided by the frequency doubler 27 is applied to the other input circuit of the phase detector 54.

In this embodiment of the invention, the phase detector 54 must be a type which is responsive to both the amplitude and the phase of the signals applied to the input circuits thereof. This is necessary because the abrupt change in the phase relationship between the signals applied to the input circuits of the phase detector 54 at the frequency $f_1$ does not provide a suitable control signal for the servo system shown in Fig. 5.

The phase detector 54 may be the type shown on page 384 of the book Electronic Instruments by Greenwood, Holdam and MacRae, published in 1948 by McGraw-Hill, for example.

Instead of being connected to an indicator 28 as shown in Fig. 1, the output of the phase detector 54 in the embodiment of the invention shown in Fig. 5 is applied to a D. C. amplifier 52. The output signal produced by the D. C. amplifier 54 is applied across the resistor 44 and serves to control the voltage applied to the repeller electrode of the tube 38 so as to maintain the frequency of the signal produced by the tube 38 at the frequency $f_1$ at which the inflection point of the response curve of the low-pass filter 50 is located.

The filter 50 may be replaced by a resonant circuit such as a cavity resonator if desired. The automatic frequency control system will then maintain the frequency of the signal produced by the oscillator 38 at the frequency at which one of the inflection points of the resonance curve of the cavity resonator is located. If the leads between the phase detector 54 and the D. C. amplifier 52 are reversed, the system will then maintain the frequency of the signal produced by the oscillator 38 at the freqency at which the other inflection point of the resonance curve of the cavity resonator is located.

It will be apparent that various modifications may be made in the apparatus disclosed above without departing from the scope of the present invention. For example, other types of phase detectors and amplitude demodulators may be employed instead of the types disclosed above. The translating device whose frequency response or impedance characteristic is being determined need not be a resonant circuit but may be substantially any circuit having a frequency response curve which has one or more inflection points therealong.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination, a translating device possessing a non-linear impedance versus frequency response characteristic having at least one inflection point, an oscillator coupled to said translating device, means coupled to said oscillator for frequency-modulating the signal produced by said oscillator at two different frequencies, said translating device producing an amplitude-modulated output signal from the applied frequency-modulated input signal, an amplitude demodulator coupled to said translating device, a first frequency-responsive network coupled to the output of said amplitude demodulator, a phase comparator having one input circuit coupled to the output of said network, and means including a second frequency-responsive network coupling another input circuit of said phase comparator to the output of said frequency-modulating means, said first and second frequency-responsive networks being tuned to pass one of the first order heterodyne components of said two frequencies at which the signal produced by said oscillator is frequency-modulated, said first and second frequency-responsive networks substantially rejecting said two different frequency components of said frequency-modulating means.

2. In apparatus for measuring the frequency response of a resonant circuit, a radio frequency oscillator coupled to said resonant circuit, means for varying the frequency relationship between the resonant frequency of the resonant circuit and the frequency of said oscillator, oscillator means connected to said radio frequency oscillator for frequency-modulating the output thereof, said resonant circuit producing an amplitude-modulated radio frequency signal therein, an amplitude demodulator having an input circuit coupled to said resonant circuit, a filter coupled to the output of said amplitude demodulator and tuned to pass the frequency of a single distortion component of the demodulated output signal, said single distortion component being produced by said resonant circuit, said filter substantially rejecting all other distortion components of the demodulated output signal and further rejecting the demodulated fundamental frequency component of said oscillator means, and a phase detector having one input circuit coupled to the output of said filter and having another input circuit coupled to the output of said oscillator means.

3. In apparatus for determining the frequencies at which the inflection points of the resonance curve of a resonant circuit occur, an oscillator for producing a radio frequency signal and having means for coupling the output thereof to a resonant circuit, means coupled to said oscillator for frequency-modulating the output thereof, the resonant circuit producing an amplitude-modulated output signal from the applied frequency-modulated input signal, an amplitude demodulator having an input circuit for coupling the amplitude demodulator to the resonant circuit, filter means coupled to the output of said amplitude demodulator and tuned to the frequency of a single distortion component of the demodulated output signal, said single distortion component being produced by the resonant circuit, said filter passing said single distortion component and substantially rejecting all other frequency components of the demodulated output signal, a phase comparator having one input circuit coupled to the output of said filter means, and intercoupling means connected between the output of said frequency-modulating means and another input circuit of said phase comparator.

4. The apparatus of claim 3, wherein said intercoupling means includes a frequency doubler.

5. The apparatus of claim 3, wherein said frequency-modulating means is an oscillator which produces a signal having a predetermined frequency, and wherein said filter means is tuned to pass a single harmonic of said predetermined frequency.

6. The apparatus of claim 3, wherein said frequency-modulating means comprises a pair of oscillators which produce signals of two different frequencies, and wherein said filter means is tuned to pass the frequency of one of the first order heterodyne components of said two different frequencies.

7. The apparatus of claim 6, wherein the intercoupling means between the output of said frequency-modulating means and one of the input circuits of said phase comparator includes a filter tuned to pass the frequency of said first order heterodyne component of said two different frequencies.

8. In combination, a translating device having a non-linear impedance versus frequency response characteristic, an oscillator coupled to said translating device and having a control circuit for controlling the frequency of the signal produced by the oscillator, means coupled to said oscillator for frequency-modulating the signal produced thereby, said translating device producing an amplitude-modulated output signal from the applied frequency-modulated input signal, an amplitude demodulator coupled to said translating device, filter means coupled to the output of said amplitude demodulator and tuned to pass the frequency of a single distortion component of the demodulated output signal, said single distortion component being produced by said translating device, a phase detector having one input circuit coupled to the output of said filter means and having another input circuit coupled to the output of said frequency-modulating means, and a circuit intercoupling the output circuit of said phase detector and the control circuit of said oscillator for controlling the frequency of the signal produced by the oscillator.

9. The apparatus of claim 8, wherein said translating device is a filter.

10. In combination, an electrical translating device having an input circuit and an output circuit, said translating device having an impedance characteristic as a function of frequency which may be represented by a curve having an inflection point located at a predetermined frequency, an oscillator coupled to said translating device and having a control circuit for controlling the frequency of the signal produced by the oscillator, means coupled to said oscillator for frequency-modulating the signal produced by the oscillator at a predetermined fixed frequency, said translating device producing an amplitude-modulated output signal from the applied frequency-modulated input signal, an amplitude demodulator coupled to said translating device, a filter coupled to the output of said amplitude demodulator and tuned to pass the second harmonic of said fixed frequency, said second harmonic of said fixed frequency being produced by said translating device, said filter substantially rejecting all other harmonics and rejecting said fixed frequency, a phase detector having one input circuit coupled to the output of said filter and having another input circuit coupled to the output of said frequency-modulating means, and a circuit intercoupling the output circuit of said phase detector and the control circuit of said oscillator for causing the frequency of the signal produced by said oscillator to be maintained substantially at said predetermined frequency.

11. The method of determining the frequencies at which the inflection points of the resonance curve of a resonant circuit occur, comprising the steps of applying a radio frequency signal which is frequency modulated at two different frequencies to the resonant circuit to produce an amplitude-modulated signal in the resonant circuit, varying the frequency relationship between the resonant frequency of the resonant circuit and the fundamental frequency of the frequency-modulated signal, demodulating said amplitude-modulated signal, selecting a component of the demodulated signal having the frequency of a first order heterodyne component of the two modulating frequencies, providing a reference signal having the same frequency as said first order heterodyne component of the two modulating frequencies by heterodyning the two modulating frequencies, and providing an indication of the phase relationship between said selected component and said reference signal.

12. An apparatus for automatically synchronizing the frequency of a controllable oscillator to the frequencies at which the inflection points of the response characteristic of an electrical network occur, comprising a controllable oscillator for producing an alternating output voltage and having means adapted for coupling the output thereof to said electrical network, means coupled to said controllable oscillator for frequency-modulating the alternating output voltage, an amplitude demodulator having an input circuit adapted for coupling the amplitude demodulator to said electrical network, frequency selective means coupled to the output of said amplitude demodulator and responsive to the frequency of a single distortion component of the demodulated output signal from said amplitude demodulator, said single distortion component being produced by said electrical network, said frequency selective means substantially rejecting all other distortion components of the demodulated output signal and further rejecting the demodulated fundamental frequency component of the frequency-modulating means, a phase detector having a first input circuit and a second input circuit, said first input circuit being coupled to the output of said frequency selective means for receiving said single selected distortion component, intercoupling means connected between the output of said frequency modulating means and said second input circuit of said phase detector, and means coupling the output of said phase detector to said controllable oscillator for automatically adjusting the frequency of the alternating output voltage to a frequency of an inflection point of the response characteristic of said electrical network.

13. In combination, a translating device possessing a non-linear impedance versus frequency response characteristic having at least one inflection point, an oscillator coupled to said translating device, means coupled to said oscillator for frequency-modulating the signal produced thereby, said translating device producing an amplitude-modulated output signal from the applied frequency-modulated input signal, said amplitude-modulated output signal having amplitude distortion components produced by the non-linear response characteristic of said translating device, an amplitude demodulator coupled to said translating device, a frequency-responsive network coupled to the output of said amplitude demodulator, said network passing a single distortion component of the demodulated output signal, said single distortion component being produced by said translating device, said network substantially rejecting all other distortion components of the demodulated output signal and further rejecting the demodulated fundamental frequency component of the frequency-modulating means, and a phase comparator having one input circuit coupled to the output of said network and having another input circuit coupled to the output of said frequency-modulating means.

14. In combination, a translating device possessing a non-linear impedance versus frequency response characteristic having at least one inflection point, an oscillator coupled to said translating device, means coupled to said oscillator for frequency-modulating the signal produced by said oscillator at a predetermined frequency, said translating device producing an amplitude-modulated output signal from the applied frequency-modulated input signal, said amplitude-modulated output signal having amplitude distortion components produced by the non-linear response characteristic of said translating device, a frequency-responsive network coupled to the output of said amplitude demodulator, said network being tuned to pass a single harmonic component of said predetermined frequency at which the signal produced by said oscillator is frequency modulated, said single harmonic component being produced by said translating device, and said network substantially rejecting all other harmonic components of said predetermined frequency and further rejecting said predetermined frequency component, and a phase comparator having one input circuit coupled to the output of said network and having another input circuit coupled to the output of said frequency-modulating means.

15. The method of determining the frequencies at which the non-linear distortion of a translating device is substantially a minimum, the translating device possessing a non-linear impedance versus frequency response characteristic having at least one inflection point, consisting in the steps of applying a frequency-modulated signal to the translating device for producing an amplitude-modulated signal therein, demodulating said amplitude-modulated signal, selecting a particular distortion component of said demodulated signal, said selected distortion component being generated by said non-linear translating device, measuring the phase relationship between said particular selected distortion component of the demodulated signal and the modulation of the frequency-modulated signal, and adjusting the average frequency of the frequency-modulated signal to determine the frequencies at which sharply defined changes occur in the measured phase relationship.

16. The method of determining the frequencies at which the inflection points of the resonance curve of a resonant circuit occur, consisting in the steps of applying a radio frequency signal which is frequency-modulated at a predetermined fixed frequency to the resonant circuit for producing an amplitude-modulated signal therein, demodulating said amplitude-modulated signal, selecting a particular single distortion component of said demodulated signal, said single distortion component being generated by said resonant circuit, producing a reference signal of the same frequency as said single distortion component, said reference signal being synchronized with the modulation of the frequency-modulated signal, measuring the phase relationship between said selected single distortion component of the demodulated signal and the reference signal, and adjusting the average frequency of the frequency-modulated radio frequency signal to determine the frequencies at which sharply defined changes occur in the measured phase relationship.

References Cited in the file of this patent

UNITED STATES PATENTS

| Number | Name | Date |
|---|---|---|
| 1,450,966 | Affel | Apr. 10, 1923 |
| 1,641,973 | Horton | Sept. 13, 1927 |
| 1,663,086 | Long | Mar. 20, 1928 |
| 2,121,103 | Seeley | June 21, 1938 |
| 2,510,095 | Frankel | June 6, 1950 |
| 2,541,066 | Jaynes | Feb. 13, 1951 |
| 2,617,855 | Etheridge | Nov. 11, 1952 |